United States Patent
Kang

(10) Patent No.: US 7,173,226 B2
(45) Date of Patent: Feb. 6, 2007

(54) COMPLEX HOME APPLIANCE AND METHOD OF CONTROLLING AND INSTALLING THE SAME

(75) Inventor: Jeon-Hong Kang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 571 days.

(21) Appl. No.: 10/379,897

(22) Filed: Mar. 6, 2003

(65) Prior Publication Data

US 2004/0046454 A1 Mar. 11, 2004

(30) Foreign Application Priority Data

Sep. 5, 2002 (KR) .......................... 2002-0053360

(51) Int. Cl.
*H05B 6/64* (2006.01)

(52) U.S. Cl. .................................................. 219/680

(58) Field of Classification Search ................ 219/680, 219/601, 681, 682, 683, 684, 685, 678
See application file for complete search history.

(56) References Cited

U.S. PATENT DOCUMENTS

| | | | | |
|---|---|---|---|---|
| 4,563,624 A | * | 1/1986 | Yu | .............................. 318/472 |
| 4,697,136 A | * | 9/1987 | Ishikawa | ..................... 323/267 |
| 5,799,822 A | * | 9/1998 | Rudewicz et al. | .... 221/150 HC |
| 6,365,988 B1 | | 4/2002 | Imer et al. | |
| 6,624,399 B2 | * | 9/2003 | Rypan | ......................... 219/680 |
| 6,794,770 B2 | * | 9/2004 | Kirby | ......................... 307/115 |
| 6,825,449 B2 | * | 11/2004 | Kirby | ......................... 219/507 |

FOREIGN PATENT DOCUMENTS

KR  1995-11945  5/1995

* cited by examiner

*Primary Examiner*—Daniel Robinson
(74) *Attorney, Agent, or Firm*—Staas & Halsey LLP

(57) ABSTRACT

A complex home appliance and a method of controlling and installing the same. The complex home appliance includes a single power supply unit shared by two or more component home appliances of the complex home appliance. The two or more component home appliances are controlled by a single control unit of the complex home appliance. The complex home appliance can be operated in a simultaneous operation mode in which the two or more component home appliances are simultaneously operable, and an individual operation mode in which only one of the two or more component home appliances is operable. The complex home appliance includes a mode-setting unit to set the simultaneous or individual operation mode. The complex home appliance includes a power cut-off unit which supplies power to the single power supply unit and cuts off the supply of the power in response to being electrically opened at the time of an electrical overload.

7 Claims, 5 Drawing Sheets

COMPLEX HOME APPLIANCE AND METHOD OF CONTROLLING AND INSTALLING THE SAME

CROSS-REFERENCE TO RELATED APPLICATIONS

This application claims the benefit of Korean Application No. 2002-53360, filed Sep. 5, 2002, in the Korean Intellectual Property Office, the disclosure of which is incorporated herein by reference.

BACKGROUND OF THE INVENTION

1. Field of the Invention

The present invention relates to home appliances, and more particularly, to a complex home appliance, in which home appliances such as a microwave oven, a toaster, and a coffee maker are integrated into a single system.

2. Description of the Related Art

Generally, home appliances include kitchen appliances, such as a toaster, a coffee maker and a microwave oven, and audio/video equipment, such as a stereo system, a Video Cassette Recorder (VCR), and a Digital Versatile Disc (DVD) player. The kitchen appliances are home appliances that have similar purposes and are mainly used within a region of a kitchen space. Although the kitchen appliances are used within the region of the kitchen space, the kitchen appliances are independent systems, each having a control unit (for example, a microcomputer) and a power supply unit therein.

FIG. 1 shows conventional kitchen appliances including a wall mounted microwave oven 102 having a hood function and placed above an electric/gas oven 104. A toaster 108 and a coffee maker 110 are stationed, for example, on the right and left sides of the electric/gas oven 104.

As described above, since the home appliances having a similar purpose, that is, to cook food, are placed in several locations of the kitchen space, an increased movement of a user is required to carry out food preparations. Accordingly, the additional movements increase the overall food preparation time and excessively consumes the user's energy.

SUMMARY OF THE INVENTION

Accordingly, an aspect of the present invention is to provide a complex home appliance, in which home appliances having similar purposes and are used in a restricted region of a home, are integrated into a single system.

Another aspect of the present invention is to provide a complex home appliance which allows a user to use component home appliances thereof simultaneously or individually, thus preventing an electrical overload due to the simultaneous operation of the component home appliances where an insufficient amount of power is supplied.

Additional aspects and advantages of the invention will be set forth in part in the description which follows and, in part, will be obvious from the description, or may be learned by practice of the invention.

To achieve the above and/or other aspects of the present invention, there is provided a complex home appliance comprising two or more component home appliances which are integrated into the complex home appliance as a single system, and a single power supply unit which is shared by the two or more component home appliances of the complex home appliance. The complex home appliance may further comprise a single control unit which controls the two or more component home appliances.

The complex home appliance can simultaneously operate the two or more component appliances in a simultaneous operation mode thereof, and operate only one of the two or more component home appliances in an individual operation mode thereof.

The complex home appliance may include a mode-setting unit to set the simultaneous or individual operation mode.

The complex home appliance may include a power cut-off unit which cuts off a supply of power to the single power supply unit in response to being electrically opened to prevent an electrical overload.

BRIEF DESCRIPTION OF THE DRAWINGS

These and other aspects and advantages of the present invention will become apparent and more readily appreciated by describing in detail a preferred embodiment thereof with reference to the accompanying drawings in which.

DETAILED DESCRIPTION OF THE PREFERRED EMBODIMENTS

Figure 1:
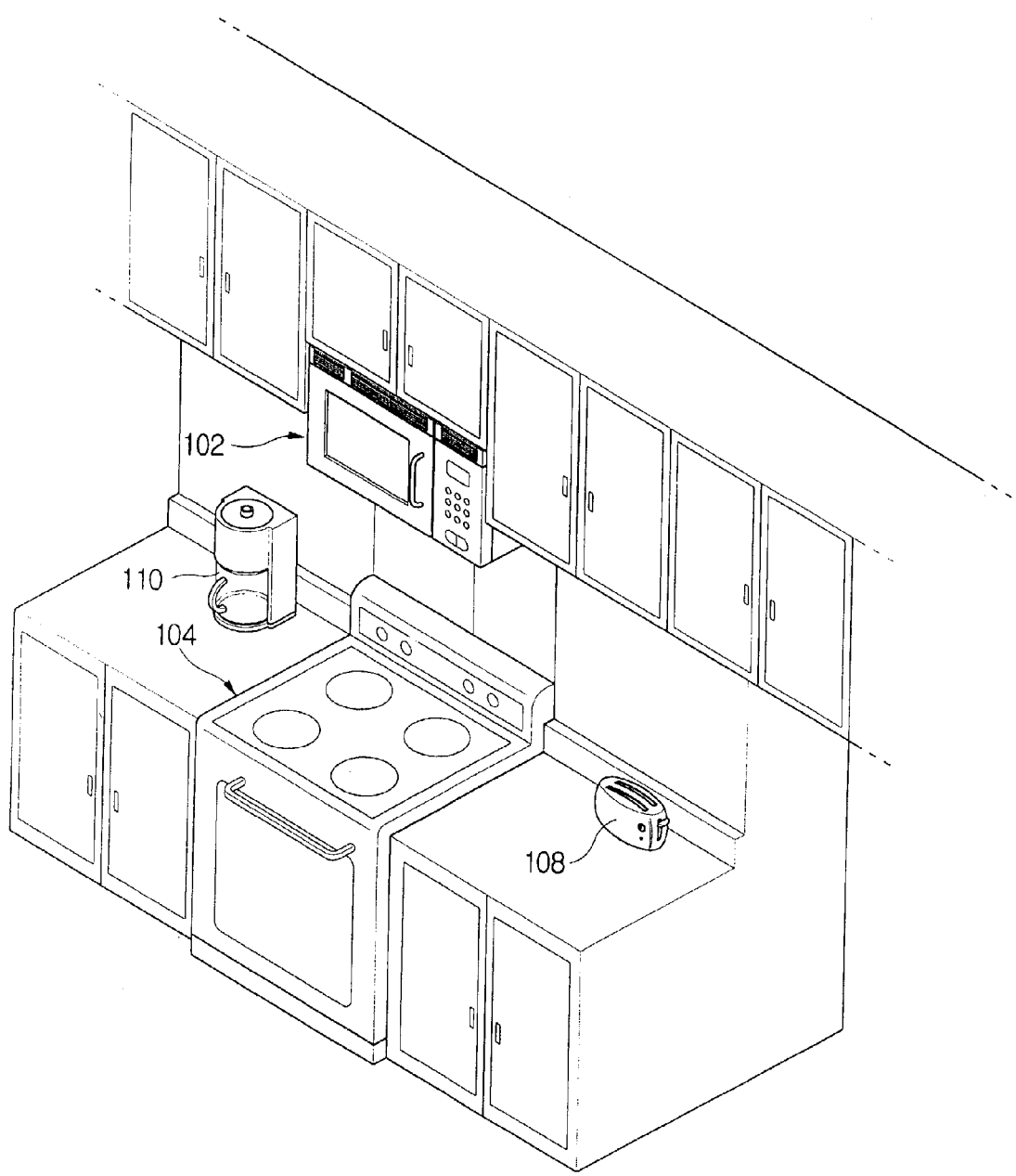
FIG. 1 is a perspective view illustrating a use of conventional kitchen appliances.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
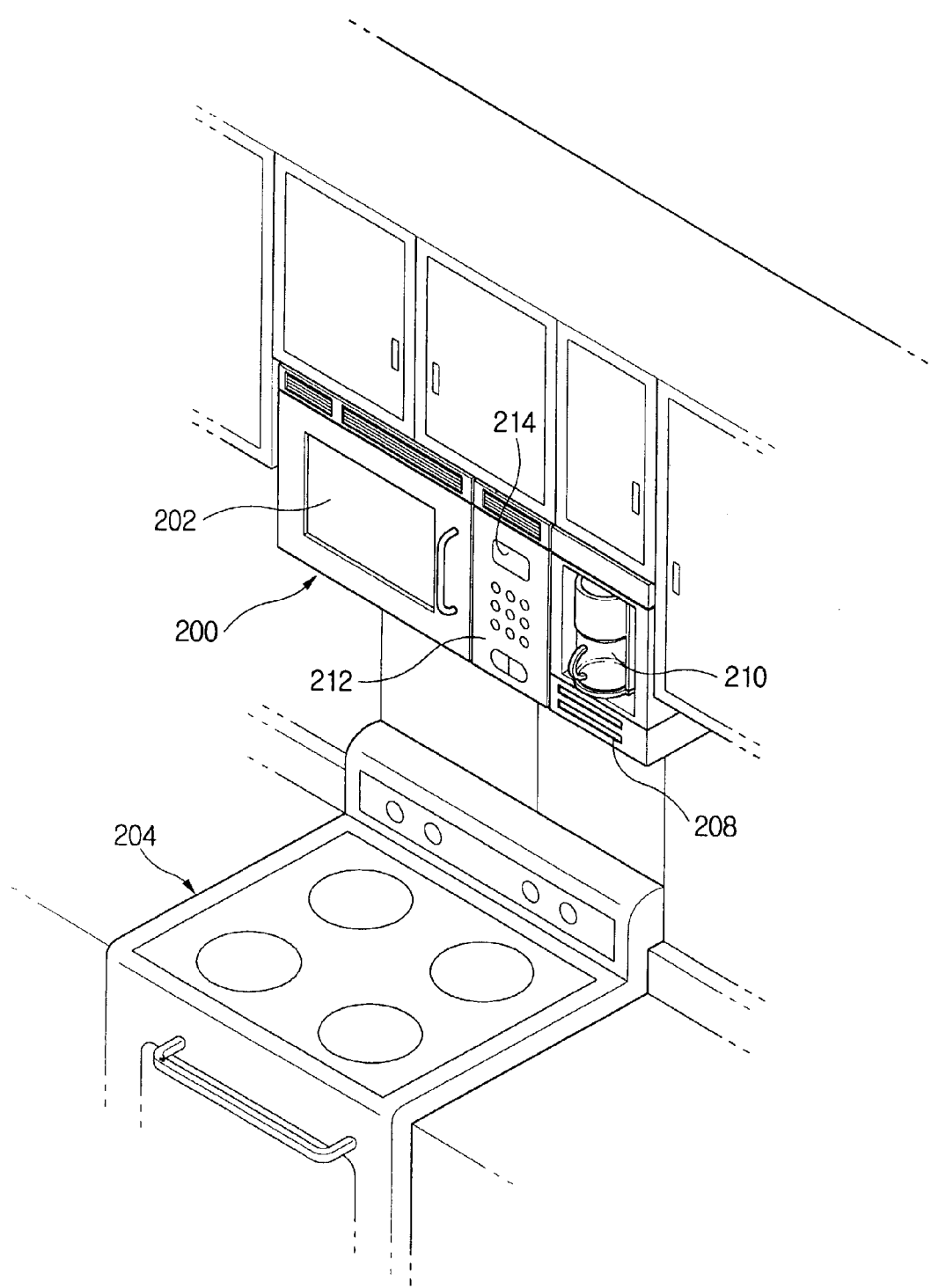
FIG. 2 is a perspective view of a complex home appliance according to an embodiment of the present invention.

FIG. 2 shows a perspective view of a complex home appliance 200 according to an embodiment of the present invention. As shown in FIG. 2, the complex home appliance 200 of the present invention is placed and used, for example, above an electric or gas oven 204. The complex home appliance 200 of the present invention is a single system into which component home appliances including a wall mounted microwave oven 202 having a hood function, a toaster 208 and a coffee maker 210 are integrated. In this case, the single system refers to, for example, a system that shares a single power supply unit and is controlled by a single control unit.

A ventilation device (not shown) is placed within the wall mounted microwave oven 202 having the hood function to discharge steam, odor and smoke generated by a use of the electric/gas oven 204. Additionally, a ventilation motor (not shown) is placed within the wall mounted microwave oven 202 having the hood function to drive the ventilation device. The ventilation device shares the single power supply unit of the complex home appliance 200, and is controlled by the single control unit of the complex home appliance 200. In addition, the wall-mounted microwave oven 202 is provided with an input unit 212 to input setting conditions required to cook food. Set values input through the input unit 212, and various cooking information are visually displayed on a display unit 214.

Figure 3:
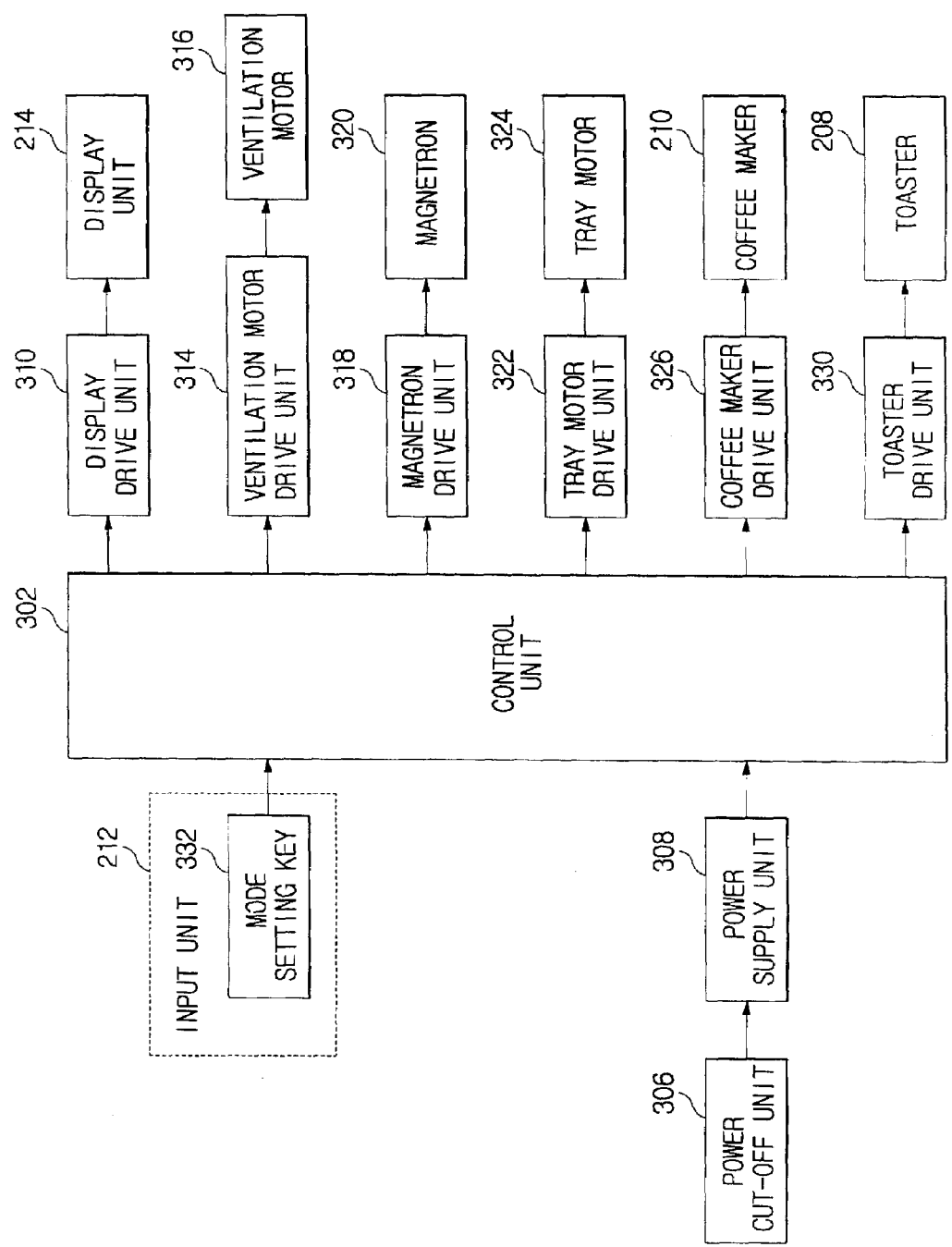
FIG. 3 is a block diagram of the complex home appliance shown in FIG. 2.

FIG. 3 shows a block diagram of the complex home appliance 200 shown in FIG. 2. As shown in FIG. 3, input ports of a control unit 302 that controls the overall operation of the complex home appliance 200 is connected to the input unit 212 and a power supply unit 308. The input unit 212 includes a mode-setting key 332 which is capable of setting a simultaneous or an individual operation mode of the complex home appliance 200. An input port of the power supply unit 308 is connected to a power cut-off unit 306 installed, for example, in a home. That is, the power supply unit 308 is supplied with power through the power cut-off unit 306, transforms the power to a type of power needed for the complex home appliance 200, such as Alternating Current (AC), Direct Current (DC), or power of a desired voltage level, and provides the transformed power to the component home appliances of the complex home appliance 200.

The output ports of the control unit 302 are connected to a display drive unit 310, a ventilation motor drive unit 314, a magnetron drive unit 318, a tray motor drive unit 322, a coffee maker drive unit 326 and a toaster drive unit 330 to drive the display unit 214, the ventilation motor 316, the magnetron 320, the tray motor 324, the coffee maker 210 and the toaster 208, respectively. The magnetron 320 installed in the microwave oven 202 is used to heat food by generating electromagnetic waves. The tray motor 324 is used to rotate a tray (not shown) of the microwave oven 202.

In the simultaneous operation of the component home appliances of the complex home appliance 200, where power consumed is greater than a rated power of the power cut-off unit 306, the power cut-off unit 306 is electrically opened and the supply of the power to the power supply unit 308 is cut-off to prevent an electrical overload. In a home where the rated power of the power cut-off unit 306 is sufficiently great because the amount of the supplied power is sufficiently great, such a problem does not occur even though all of the component home appliances of the complex home appliance 200 are used. However, since the rated power of the power cut-off unit 306 is not great in a home where the amount of the supplied power is not sufficiently great, the power cut-off unit 306 is electrically opened in response to the electrical overload caused by the simultaneous operation of the component home appliances of the complex home appliance 200. In such a case, the power supply unit 308 is not supplied with power and all of the component home appliances of the complex home appliance 200 are not allowed to be used simultaneously.

Accordingly, all of the component home appliances of the complex home appliance 200 are allowed to be simultaneously used in a home where the rated power of the power cut-off unit 306 is sufficiently great. On the other hand, the component home appliances of the complex home appliance 200 are allowed to be, for example, individually used in a home where the rated power of the power cut-off unit 306 is not sufficiently great, so as to utilize the complex home appliance 200 even in the case where the amount of the supplied power is not sufficiently great.

To implement the above-described concept, a process of setting a simultaneous or individual operation mode of the complex home appliance 200 according to the rated power of the power cut-off unit 306 is required before an operation of the complex home appliance 200, and after the installation of the complex home appliance 200. The setting of the simultaneous or individual operation mode can be directly performed by a manufacturing company of the complex home appliance 200, after the installation of the complex home appliance 200. However, the setting of the simultaneous and individual operation mode may be performed by a user of the complex home appliance 200.

Figure 4:
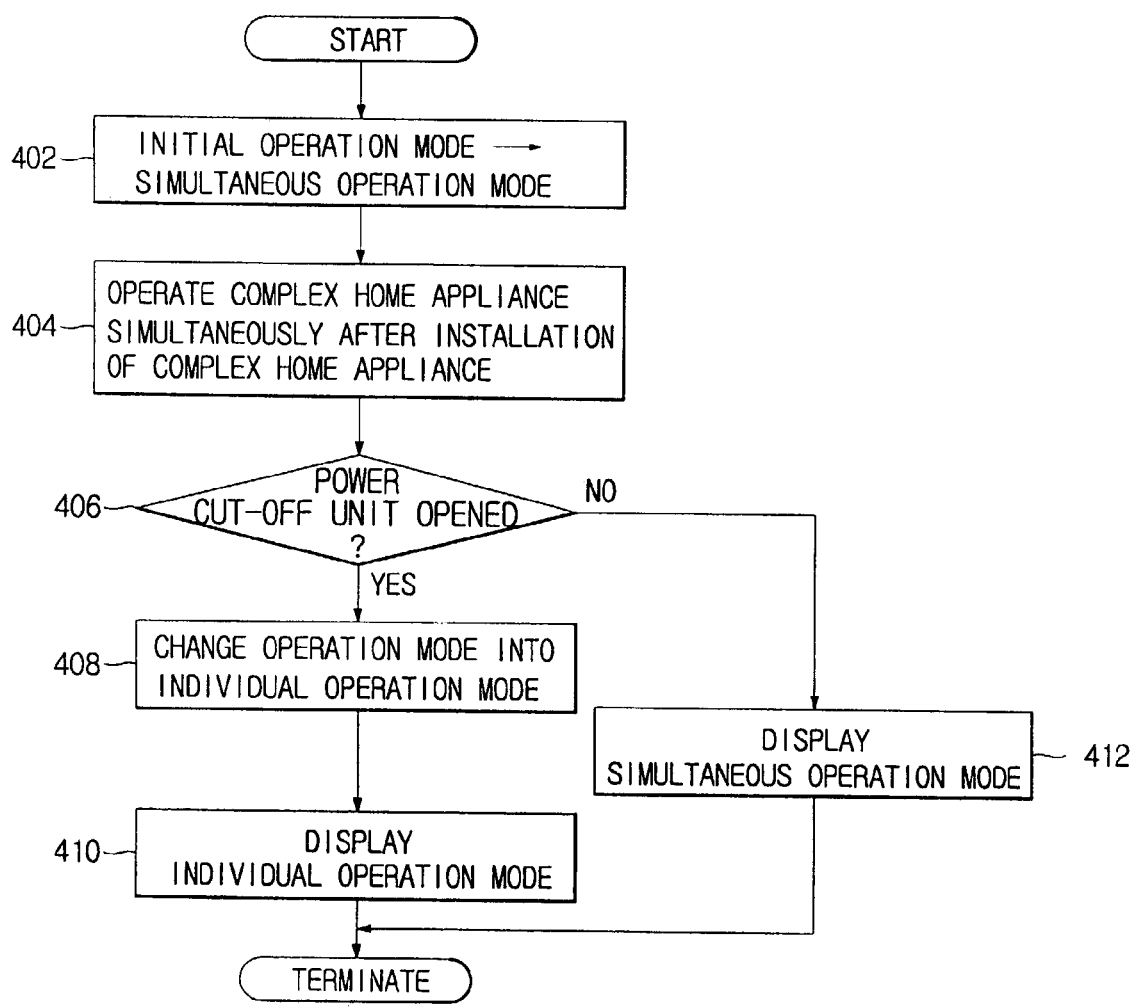
FIG. 4 is a flowchart illustrating a setting of a simultaneous or individual operation mode according to a volume of a rated power of a power cut-off unit in the complex home appliance shown in FIG. 3.

FIG. 4 shows a flowchart illustrating a setting of the simultaneous or individual operation mode according to the rated power of the power cut-off unit 306 in the complex home appliance 200 shown in FIG. 3. Where the simultaneous or individual operation mode of the complex home appliance 200 of the present invention is set, the rated power of the power cut-off unit 306, instead of the amount of the supplied power, is used because the supply of the power to the power supply unit 308 is stopped by the power cut-off unit 306 at the time of an electrical overload, and the component home appliances of the complex home appliance 200 are not allowed to be used.

Referring to FIG. 4, an initial operation mode of the complex home appliance 200 of the present invention is set to the simultaneous operation mode in operation 402, and all of the component home appliances of the complex home appliance 200 are allowed to be simultaneously operated after the installation of the complex home appliance 200 in operation 404. Under this condition, a determination is made whether the power cut-off unit 306 is electrically opened in operation 406. Since all of the component home appliances cannot be simultaneously used where the power cut-off unit 306 is electrically opened, the complex home appliance 200 is turned on and an operation mode of the complex home appliance 200 is changed from the simultaneous operation mode to the individual operation mode in operation 408. Since the changed operation mode is displayed in the display unit 214, the user can verify that the changed operation mode is the individual operation mode through the display unit 214 in operation 410. Where the power cut-off unit 306 is determined not to be electrically opened in the operation 406, it is determined that the rated power of the power cut-off unit 306 is sufficiently great. In this case, where the complex home appliance 200 is turned on, the currently set simultaneous operation mode is displayed through the display unit 214 in operation 412.

Where a partially simultaneous operation mode is added to the operation modes of the complex home appliance 200, some of the component home appliances of the complex home appliance 200 are simultaneously used according to the rated power of the power cut-off unit 306. Accordingly, the efficiency of use of the complex home appliance 200 is further increased.

Figure 5:
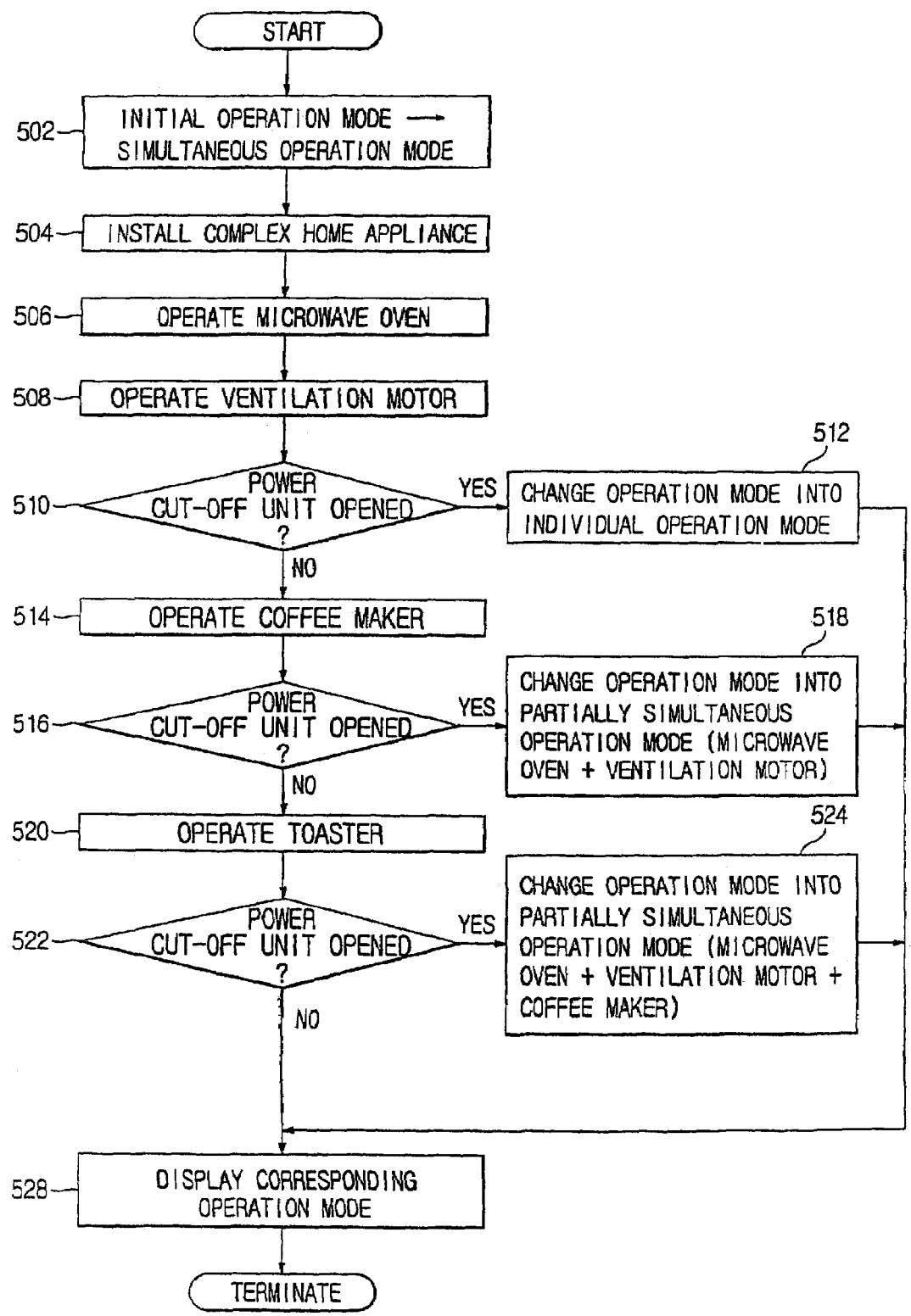
FIG. 5 is a flowchart illustrating a setting of the simultaneous, a partially simultaneous, or the individual operation mode according to the volume of the rated power of the power cut-off unit in the complex home appliance shown in FIG. 3.

FIG. 5 shows a flowchart illustrating the setting of the simultaneous, partially simultaneous or individual operation mode according to the rated power of the power cut-off unit 306 in the complex home appliance 200 shown in FIG. 3. Here, the amount of power consumed by the component home appliances have the following increasing order with respect to each other: the microwave oven 202>the ventilation motor 316>the coffee maker 210>the toaster 208.

Referring to FIG. 5, an initial operation mode of the complex home appliance 200 is set to the simultaneous operation mode in operation 502, the complex home appliance 200 is installed, for example, in a cooking space in operation 504, and the microwave oven 202 and the ventilation motor 316 are simultaneously operated in operations 506 and 508, respectively. In this state, a determination is made whether the power cut-off unit 306 is electrically opened in operation 510. Where the power cut-off unit is electrically opened, the microwave oven 202 and the ventilation motor 316, as well as the other component home appliances, cannot be simultaneously used.

Accordingly, the complex home appliance 200 is turned on and an operation mode of the complex home appliance 200 is changed from the simultaneous operation mode to the individual operation mode in operation 512. Two or more of the component home appliances of the complex home appliance 200 cannot be simultaneously used in the individual operation mode, while a single component home appliance may be used. Since the changed operation mode is displayed in the display unit 214, the user can verify that the changed operation mode is the individual operation mode through the display unit 214 in operation 528.

Where the power cut-off unit 306 is not opened in the operation 510, the coffee maker 210 is allowed to be operated in operation 514, and it is determined whether the power cut-off unit 306 is electrically opened in operation 516. In this case, where the power cut-off unit 306 is electrically opened, the amount of the rated power of the power cut-off unit 306 is restricted to allow only the microwave oven 202 and the ventilation motor 316 to be used.

Accordingly, the complex home appliance 200 is turned on and the operation mode of the complex home appliance 200 is changed from the simultaneous operation mode to a partially simultaneous operation mode (for the microwave oven 202 and the ventilation motor 316) in operation 518. Only the microwave oven 202 and the ventilation motor 316 may be simultaneously used in this partially simultaneous operation mode, while the rest of the component home appliances of the complex home appliance 200 may not be simultaneously used with the microwave oven 202 and the ventilation motor 316. Since the changed operation mode is displayed in the display unit 214, the user can verify that the changed operation mode is the partially simultaneous operation mode through the display unit 214 in the operation 528.

The rated power of the power cut-off unit 306 is determined to be sufficiently great where the power cut-off unit 306 is not electrically opened in the operation 516, after the operation of the coffee maker 210. Accordingly, the toaster 208 is allowed to be operated in operation 520, and a determination is made whether the power cut-off unit 306 is electrically opened in operation 522. In this case, where the power cut-off unit 306 is electrically opened, only the microwave oven 202, the ventilation motor 316 and the coffee maker 210 can be simultaneously operated with the amount of the rated power of the power cut-off unit 306. Accordingly, the complex home appliance 200 is turned on and the operation mode of the complex home appliance 200 is changed from the simultaneous operation mode to a partially simultaneous operation mode (for the microwave oven 202, the ventilation motor 316 and the coffee maker 210) in operation 524. Only the microwave oven 202, the ventilation motor 316 and the coffee maker 210 can be simultaneously used in this partially simultaneous operation mode, while the rest of the component home appliances of the complex home appliance 200, that is, the toaster 208, may not be simultaneously used along with the microwave oven 202, the ventilation motor 316 and the coffee maker 210. Since the changed operation mode is displayed in the display unit 214, the user can verify that the changed operation mode is the partially simultaneous operation mode (for the microwave oven 202, the ventilation motor 316 and the coffee maker 310) through the display unit 214 in the operation 528.

The rated power of the power cut-off unit 306 is determined to be sufficiently great to simultaneously operate all of the component home appliances where the power cut-off unit 306 is not electrically opened in the operation 522, after the operation of the toaster 208. Accordingly, the complex home appliance 200 is turned on and the operation mode of the complex home appliance 200 is confirmed to be the simultaneous operation mode in operation 526. In this case, all of the component home appliances of the complex home appliance 200 may be simultaneously used. Since the operation mode is displayed in the display unit 214, the user can verify that the operation mode is the simultaneous operation mode through the display unit 214 in the operation 528.

As described above, a complex home appliance of the present invention increases a user's convenience by providing a single system which integrates component home appliances having similar purposes in a region of a home. In addition, the complex home appliance of the present invention solves an electrical overloading problem which occurs due to a simultaneous use of the component home appliances of the complex home appliance. That is, the present complex home appliance allows a user to use the component home appliances simultaneously, partially simultaneously, or individually according to a rated power of a power cut-off unit.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A complex home appliance, comprising:
   two or more component home appliances which are integrated into the complex home appliance as a single system;
   a single power supply unit which is shared by the two or more component home appliances of the complex home appliance; and
   a single control unit which controls the two or more component home appliances, wherein the complex home appliance allows the two or more component home appliances to be simultaneously operable in a simultaneous operation mode thereof, and allows only one of the two or more component home appliances to be operable in an individual operation mode thereof.

2. The appliance as set forth in claim 1, further comprising a mode setting unit to set the simultaneous or individual operation mode.

3. A complex home appliance, comprising:
   two or more component home appliances which are integrated into the complex home appliance as a single system;
   a single power supply unit which is shared by the two or more component home appliances of the complex home appliance; and
   a power cut-off unit which electrically opens to cut off a supply of power to the single power supply unit to prevent an electrical overload of the complex home appliance when the complex home appliance exceeds a power level;
   wherein the power cut-off unit electrically supplies power to the single supply unit when only one of the components of the complex home appliance is operating and the operation does not exceed the power level.

4. The complex home appliance as set forth in claim 1, wherein the two or more component home appliances includes:
   a microwave oven unit having a ventilation motor which exhaust gas generated therebelow to the outside of the complex home appliance, a magnetron which generates microwave to cook food, a tray to receive the food thereon, and a tray motor which rotates the tray;
a toaster unit; and
a coffee maker unit.

5. The complex home appliance as set forth in claim 4, further comprising:
a control unit which controls an overall operation of the complex home appliance;
a display unit which displays information of the complex home appliance;
a display drive unit which drives the display unit;
a ventilation motor drive unit which drives the ventilation motor;
a magnetron drive unit which drives the magnetron;
a tray motor drive unit which drives the tray motor;
a coffee maker drive unit which drives the coffee maker unit; and
a toaster drive unit which drives the toaster unit, wherein the single power supply, display, ventilation motor, magnetron, tray motor, coffee maker, and toaster drive units are electrically connected to the control unit.

6. The complex home appliance as set forth in claim 3, wherein the single power supply unit provides the power to one or more of the two or more component home appliances, to operate, according to a rated power level of the power cut-off unit.

7. A complex home appliance, comprising:
a plurality of component home appliances which are integrated into the complex home appliance as a single system;
a single control unit which is shared by the plurality of component home appliances of the complex home appliance; and
a single control unit which controls the plurality of component home appliances;
wherein the complex home appliance allows the plurality of component home appliances to be simultaneously operable in a simultaneous mode thereof,
wherein the complex home appliance allows less than a plurality of component home appliances to be operable in a partially simultaneous operation mode, and
wherein the complex home appliance allows only one of the component home appliances to be operable in an individual operation mode.

\* \* \* \* \*